May 31, 1955      H. D. ABELL ET AL      2,709,585
AUTOMATIC FOLDER

Filed April 27, 1949      6 Sheets-Sheet 1

Harry D. Abell
Homer E. Abell &
Norman R. Heald
INVENTORS

BY *Edward Taylor*

ATTORNEY

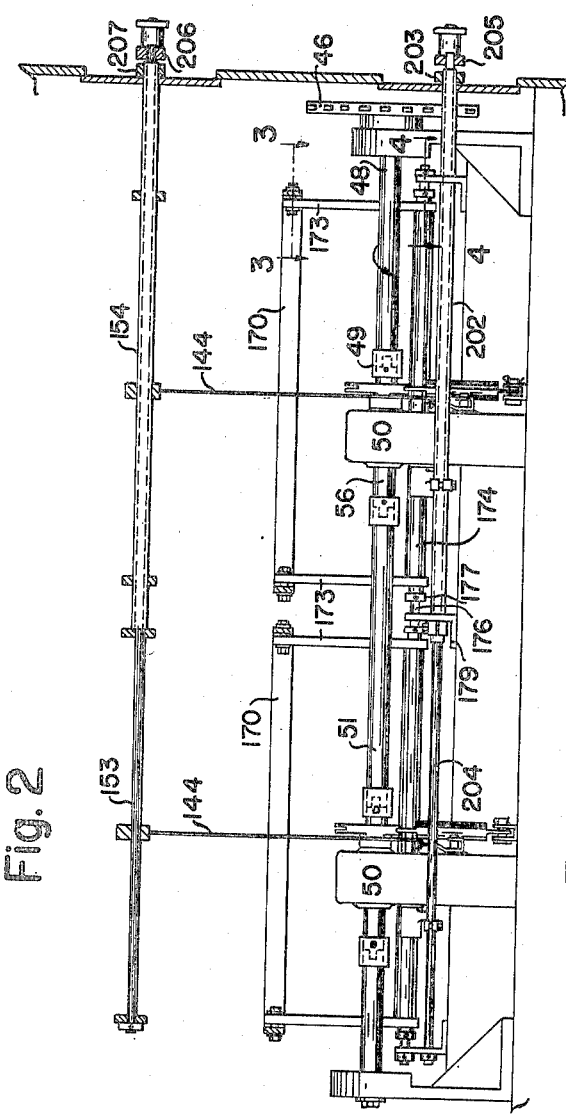

May 31, 1955     H. D. ABELL ET AL     2,709,585
AUTOMATIC FOLDER
Filed April 27, 1949     6 Sheets-Sheet 3
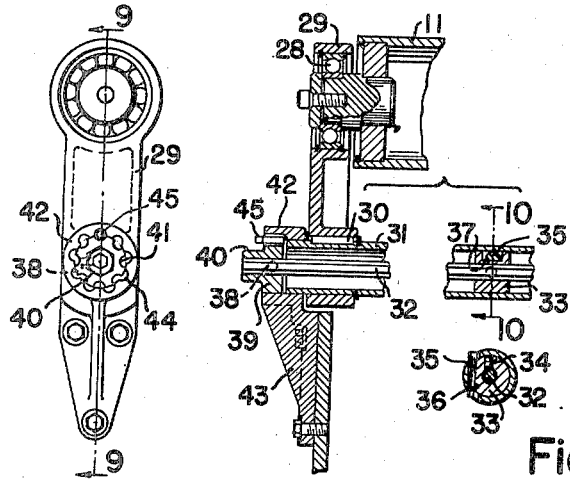
Fig. 8    Fig. 9    Fig. 10
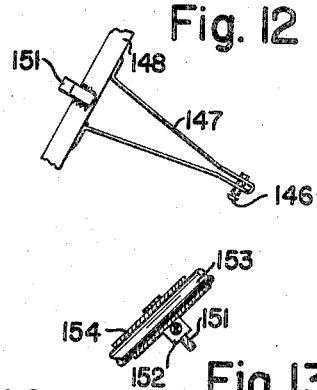
Fig. 12
Fig. 13
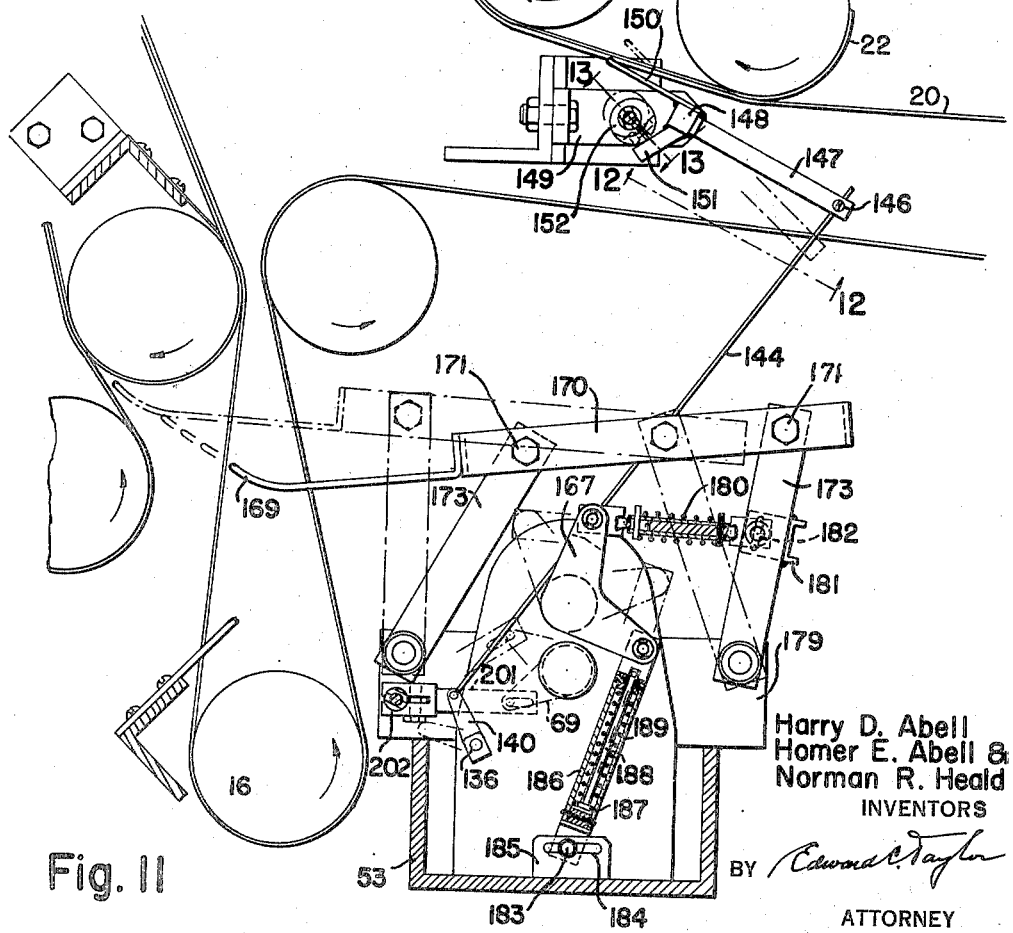
Fig. 11
Harry D. Abell
Homer E. Abell &
Norman R. Heald
INVENTORS
BY Edward C. Taylor
ATTORNEY

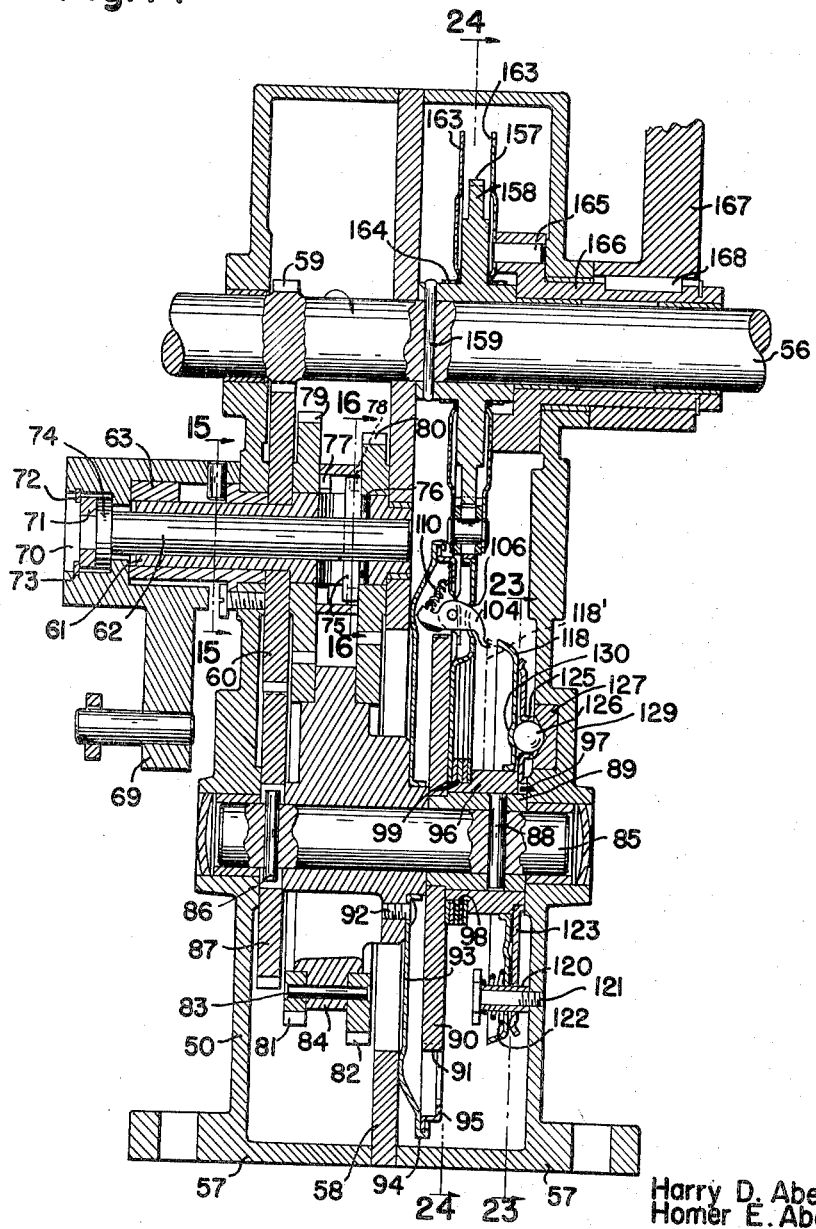

May 31, 1955
H. D. ABELL ET AL
2,709,585
AUTOMATIC FOLDER
Filed April 27, 1949
6 Sheets-Sheet 5
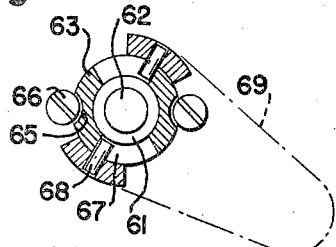
Fig.15
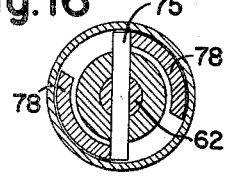
Fig.16
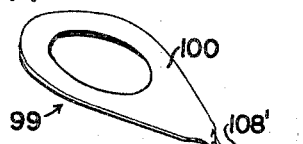
Fig.17
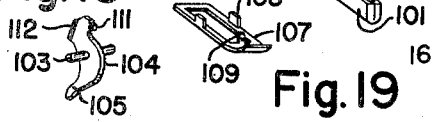
Fig.18 Fig.19
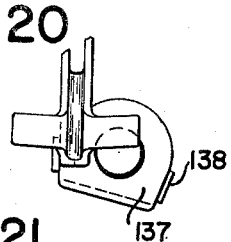
Fig.20
Fig.21
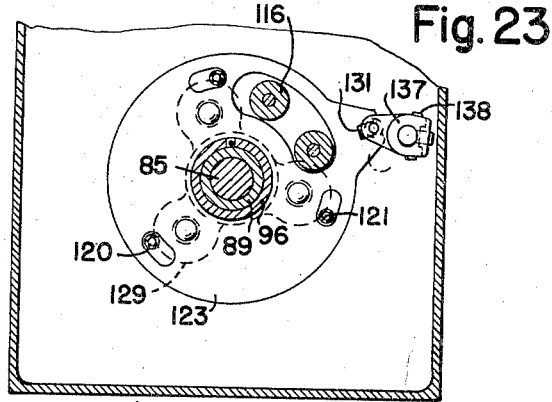
Fig.22
Fig.23
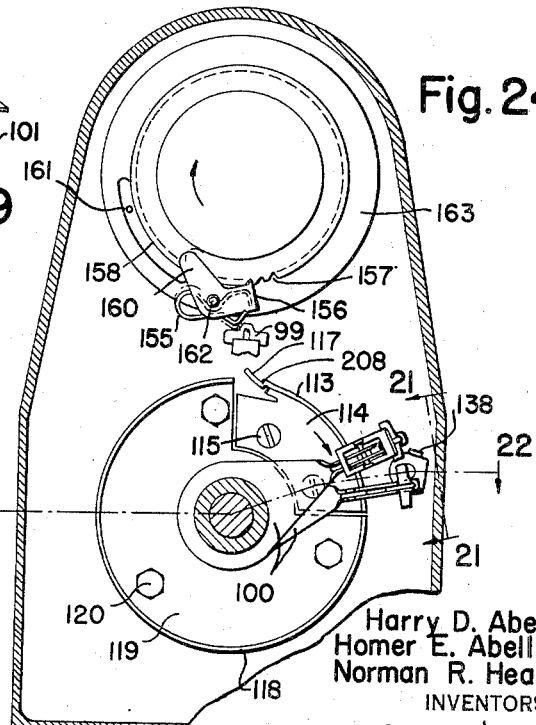
Fig.24
Harry D. Abell
Homer E. Abell &
Norman R. Heald
INVENTORS
BY *Edward Taylor*
ATTORNEY May 31, 1955  H. D. ABELL ET AL  2,709,585
AUTOMATIC FOLDER
Filed April 27, 1949  6 Sheets-Sheet 6
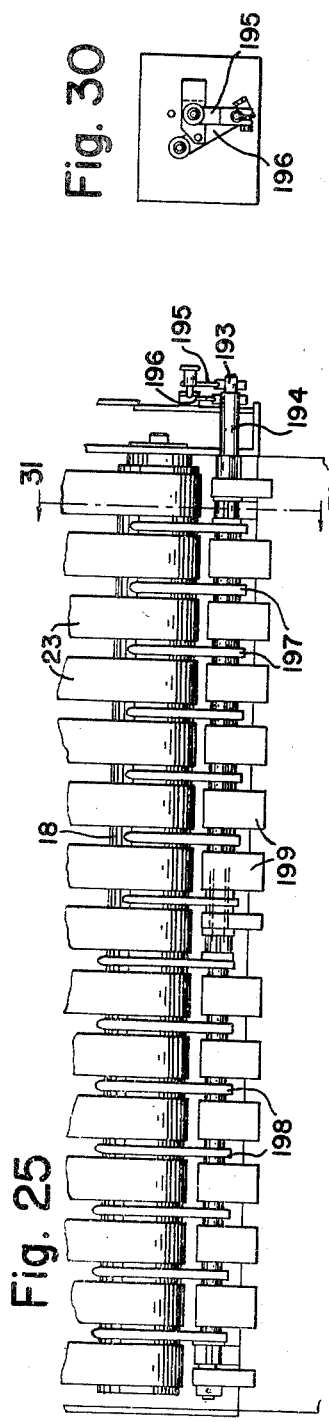
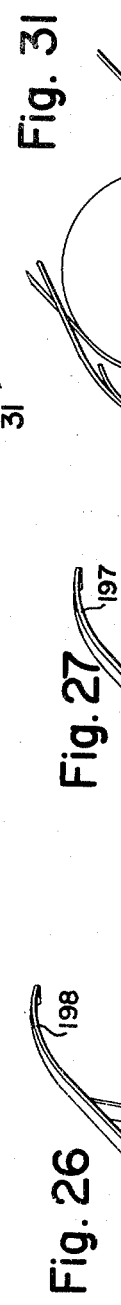
Harry D. Abell,
Homer E. Abell &
Norman R. Heald
INVENTORS
BY Edward C. Taylor
ATTORNEY United States Patent Office 2,709,585
Patented May 31, 1955

2,709,585

AUTOMATIC FOLDER

Harry D. Abell and Homer E. Abell, St. Albans, and Norman R. Heald, Chester Depot, Vt., assignors, by direct and mesne assignments, to Fisher & Christen, Washington, D. C., a firm Application April 27, 1949, Serial No. 89,904

6 Claims. (Cl. 270—81)

This invention relates to folding machines of the type in which sheet material such as laundered articles are automatically folded at definite fractions of their lengths. Such machines are in general well known, and embody a conveyor tape system to carry the articles through the machine, one or more folder blades operating to tuck the material between two adjacent belts, and folder control mechanism operated by contact with the sheet to actuate the folders to fold the sheet at the desired fraction of its length. The present invention is an improvement on prior machines of this type in the particulars noted below.

One object of the invention is to provide a folder having folding blades optionally operating alone or in succession to produce one or more folds, in which the folded articles are delivered onto the same table irrespective of the number of times they have been folded. A further object is to provide an automatic folder having separately controlled lanes, in which all the folder controlling mechanisms of a set are mounted within the conveyor tape systems and may be removed and replaced as a unit. A further object is to provide a simple control operable from one side of the machine by which the number of folds to be made may be controlled independently for different lanes or groups of lanes. A further object is to improve the folding mechanism by giving the folding blades a component of motion in the direction in which the sheet is traveling as well as one toward and from the bite of the belts. A further object is to provide novel adjustments for the folder to allow for variation in the folding action of thick and thin materials, and for location of the exact folding point. A further object is to improve the folder control mechanism in particulars which will be described in detail below. Other and further objects will appear from the specification and claims.

The invention will now be described with reference to the accompanying drawings, in which Fig. 1 is a side elevation of an automatic folder embodying our invention, with some parts broken away to show the internal construction;

Fig. 2 is a similar end view;

Fig. 3 is an enlarged section on line 3—3 of Fig. 2;

Fig. 4 is an enlarged section on line 4—4 of Fig. 2;

Fig. 5 is a detail of a control;

Fig. 6 is a detail of another control;

Fig 7 is an enlarged section on line 7—7 of Fig. 5;

Fig. 8 is a detail of a mounting for a take up roll over which the fabric-carrying tapes pass;

Fig. 9 is a section on line 9—9 of Fig. 8;

Fig. 10 is a section on line 10—10 of Fig. 9;

Fig. 11 is a side elevation, partly in section, of the first folder;

Fig. 12 is a section on line 12—12 of Fig. 11;

Fig. 13 is a section on line 13—13 of Fig. 11;

Fig. 14 is a central section through the timing mechanism for the first folder;

Fig. 15 is a section on line 15—15 of Fig. 14;

Fig. 16 is a section on line 16—16 of Fig. 14;

Fig. 17 is a perspective view of a control finger with its pawl and friction plate removed;

Fig. 18 is a perspective view of the control finger pawl;

Fig. 19 is a perspective view of the control finger friction plate;

Fig. 20 is a view on line 20—20 of Fig. 21;

Fig. 21 is an enlarged view on line 21—21 of Fig. 24;

Fig. 22 is a section on line 22—22 of Fig. 24;

Fig. 23 is a section on line 23—23 of Fig. 14;

Fig. 24 is a section on line 24—24 of Fig. 14;

Fig. 25 is a detail plan of the delivery end of the machine;

Fig. 26 is a detail of a deflector in one lane of the machine;

Fig. 27 is a detail of a deflector in another lane;

Fig. 28 is a detail of an apron in the first lane;

Fig. 29 is a detail of an apron in the second lane;

Fig. 30 is a detail end view of a control shown in Fig. 25; and

Fig. 31 is an enlarged section on line 31—31 of Fig. 25.

Figure 1:
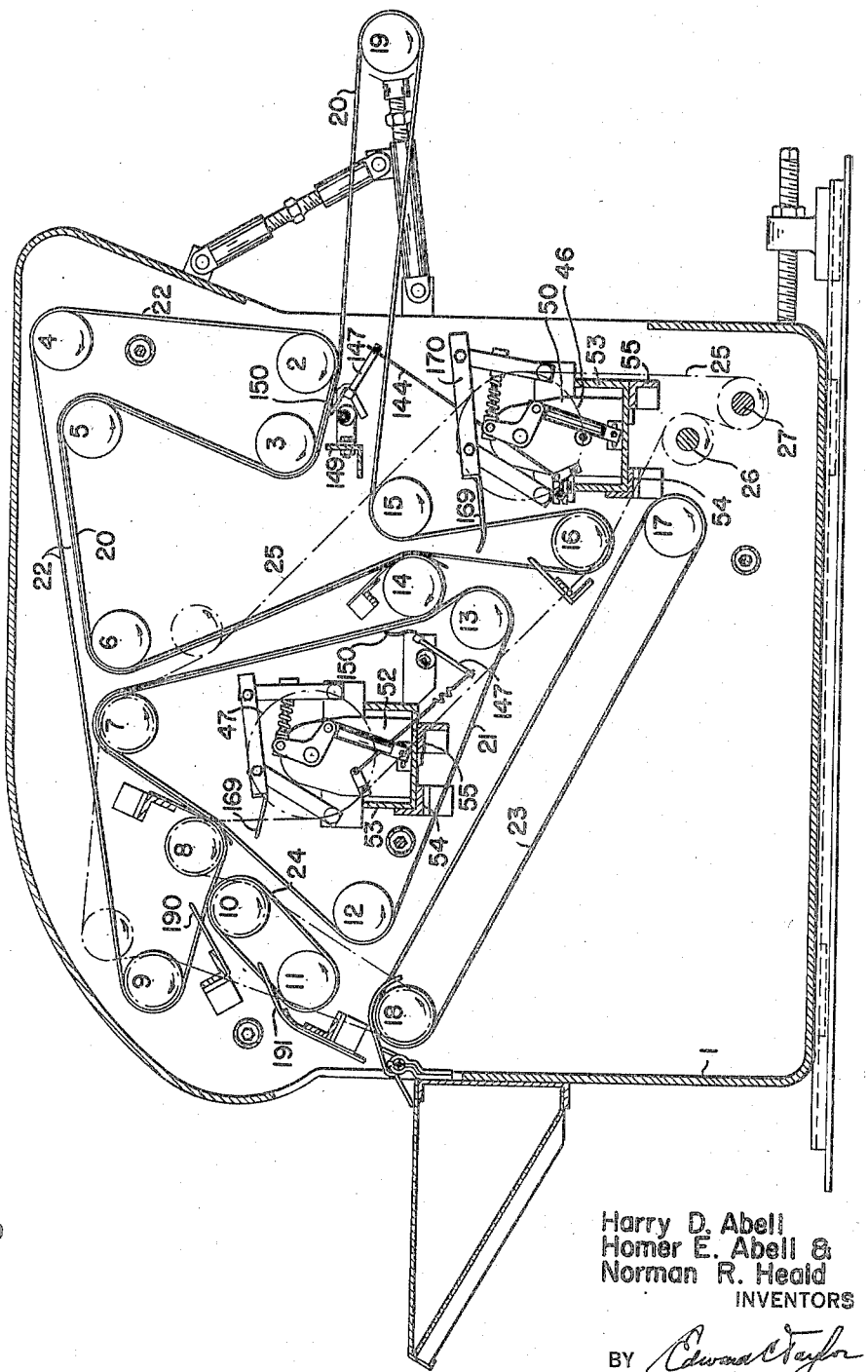

The machine is enclosed in a suitable frame 1, which is provided with bearings for the various rotating parts. Journaled in the frame are a series of tape guiding rolls 2, 3, 4, 5, 6, 7, 8, 9, 10, 11, 12, 13, 14, 15, 16, 17, 18 and 19 which are long enough to extend across all the lanes of the machine each lane being provided with a folding mechanism as will be described. These rolls support several tape systems (each consisting of tapes spaced apart along the rolls as shown in Fig. 25) infeed tapes 20 passing around rolls 19 2, 3, 5, 6, 14, 16 and 15; a central set 21 passing around rolls 7, 12 and 13 and passing in contact with roll 8; and intermediate set 22 passing around rolls 2, 3, 5, 6, 14, 7, 8, 9, and 4 and passing in contact with roll 10; a first delivery set 23 passing around rolls 17 and 18; and a second delivery set 24 passing around rolls 10 and 11. One roll in each set acts as the driver, roll 16 for the infeed set 20, roll 7 for the central set 21, roll 9 for the intermediate set 22, roll 18 for the delivery set 23, and roll 10 for the delivery set 24. As is shown in Fig. 1 a single drive chain 25 passes around sprockets connected to each of the driving rolls, and also reversely around sprockets on a pair of drive shafts 26, 27 extending across the machine. Due to the reverse passage of the chain around the latter sprockets, a main power source located anywhere along the machine can be used by connecting it to one shaft or the other depending on its direction of rotation.

Rolls 19, 12, 4, 17 and 11 are made shiftable in order that any slack in the belts may be taken up, the adjustment in the case of the last four being automatic. As will be seen in Figs. 8, 9 and 10, the mechanism by which this is done is both simple and effective. Each end of each take-up roll is carried in bearings 28 on an arm 29 keyed at 30 to a pipe 31 extending across the machine. Through the pipe extends a polygonal (preferably hexagonal) bar 32 of steel heat treated as a spring. At the center of the pipe (Fig. 10) the bar passes through a hexagonal hole in a round plug 33 in which a set screw 34 is threaded to fasten the bar and plug together. The plug is secured in the pipe as by a tapered pin 35 having a flat side 36 which bears on a flat 37 (Fig. 9) formed on the plug. At the ends of the pipe the bar 32 is held by a set screw 38 to a block 39 having a hexagonal end 40 and a plurality of semi-circular notches 41 in its periphery. The block fits snugly within an annular portion 42 of a bracket 43 firmly secured to the machine frame. Semi-circular notches 44 are formed interiorly of the annular portion, one more in number than the number of notches 41. By turning the block 39 with a wrench the bar 32 will be twisted and an elastic force applied to pipe 31 and arms 29 tending to keep the take-up roll 11 constantly and elastically tensioning its belt.

Block 39 can be held in the position giving the desired tension by inserting a pin 45 between whatever pair of notches 41, 44 are in alignment. By having one more notch in one set than in the other a vernier action is given which permits very fine adjustment.

The chain 25, in addition to its engagement with the roll driving sprockets, passes around sprockets 46 and 47 (Fig. 1), each on the end of a shaft 48 (the former is illustrated in Fig. 2). Each shaft is joined by couplings 49 to the cross shafts 56 of the set of first fold control boxes 50 or of second fold control boxes 52. As many of these control boxes as there are lanes are spaced across the machine in both the first and second sets, being connected by intermediate shafts 51. The boxes of each set are secured to a channel 53 extending across the machine and resting on angles 54 and 55 so that the channel 53 and the entire series of boxes mounted on it can be disconnected from the angles and withdrawn readily for adjustment or repair. Angle 54 preferably has one leg standing up to act as a side guide for the channel as that is being moved in or out. The boxes 50 and 52 are similar except that, while both are provided with gearing which locates the fold at the half-point of a sheet, boxes 50 alone have additional gearing enabling the folding to be done at a third-point. The reason for this is that while the first fold may be made optionally at a half-point or third-point the second fold, if made at all, is always made at the half point. The two sets of boxes are, however, preferably made with their ports interchangeable as far as is compatible with their slightly differing functions.

The nature and operation of the boxes 50 will now be described. This mechanism has for its purpose the measurement of the length of a sheet, and the actuation of a folder at the instant when the half or third point of the sheet is in the correct position. Broadly this is done in the usual way by coupling an actuating arm to a member whose speed is proportional to a half or a third of that of the sheet, and then coupling the arm to a full speed member until it reaches a predetermined position where it causes actuation of the folder. Several arms are employed in order that several articles may be in process simultaneously, and it is necessary to release the foremost of the piled up arms one at a time while holding back the remainder. In the present machine an improved escapement has been provided for this purpose which prevents accidental release of arms where several are piled up. Before describing its operation it will be necessary to consider other mechanical devices in the control box.

The box is made in two halves 57 which can be die-cast in identical form, although slightly different finishing operations are required, and which are held in any desired way on opposite sides of a central partition 58 which serves as a bearing. The drive shaft 56 has a 20-tooth gear 59 meshing with a 60-tooth gear 60 press-fitted on a sleeve 61 rotatable on a longitudinally movable shaft 62. Surrounding sleeve 61 is a stationary sleeve 63 having a shoulder bearing against the side of the casing and also having grooves 65 (Fig. 15) to accommodate the heads of set screws 66 threaded into the box wall to keep the sleeve from either endwise or rotary motion. The sleeve 63 has a pair of slanting grooves 67 receiving pins 68 attached to a rocker 69. This rocker has a recess 70 to receive a washer 71 and a spring washer 72 fitting into a groove 73 so that the head 74 of shaft 62 and the rocker are coupled together for longitudinal motion. The purpose of the rocker is to move the shaft in and out, thus operating clutch mechanism to be described, and the seemingly elaborate mechanism for a simple motion is due to the desirability of controlling the several boxes from the side of the machine by a rocking handle located there. The handle mechanism will be described after first considering the mechanism which it controls.

At its inner end shaft 62 carries a cross pin 75 (Fig. 16) projecting through slots 76 (Fig. 14) in the rotary sleeve 61 into engagement with clutch teeth 77 or 78 mounted respectively on a 48-tooth gear 79 and a 40-tooth gear 80. The sleeve 61 being functionally integral with gear 60, motion at the angular speed of that gear is imparted to either gear 79 or gear 80, depending on the longitudinal position of shaft 62. Gear 79 is in mesh with a ring gear 81 of 72 teeth, and gear 80 is in mesh with a ring gear 82 of 80 teeth, both riveted at 83 to a hub 84 mounted on a cross shaft 85. The shaft is pinned at 86 to a 60-tooth gear 87 in mesh with the gear 60, and at 88 to a sleeve 89. To this sleeve is press fitted a disk 90 having its periphery formed with fine teeth 91. On the hub 84 is screwed at 92 a disk 93 having its periphery rolled over at 94 to hold a friction ring 95. Depending upon the position of shaft 62 the hub 84 and the friction disc 93 are driven at ½ or ⅔ the speed of shaft 85 and the toothed disk 90. The discs 93 and 90 are used to drive control arms which will now be described.

Around sleeve 89 is a sleeve 96 held against rotation by a pin key 97 fastened in the casing wall. A shoulder 98 serves as a bearing upon which may turn a plurality of sheet metal control arms 99. These are all identical except for the differing offsets needed for their inner portions to lie side by side on shoulder 98, and but one of them will be described. Each arm (Fig. 17) has a central circular portion 100 tapering outwardly and folded into a ribbed portion 101 with a degree of offset sufficient to bring the ribbed portions of the several arms into line while the central portions are stacked side by side as in Fig. 14. A boss 102 (Fig. 17) is formed on the ribbed portion to support a cross pin 103 serving as a pivot for a pawl 104 (Fig. 18) having a tail 105 passing through a hole 106 (Fig. 14) in the arm. A plate 107 (Fig. 19) is centrally cut away to receive the pawl and is pivotally secured to the arm by lugs 108 fitting into grooves 108' in the latter. It has a nib 109 bent outwardly so that it may serve as an anchorage for a compression spring 110 (Fig. 14) which is anchored at the other end to a nib 111 (Fig. 18) on the pawl 104. The spring at all times presses the plate towards the friction ring 95 and the pawl towards the toothed disc 90, for the purpose of engaging which the pawl is provided with a tooth 112. If the pawl is permitted to remain in engagement with toothed disc 90 the arm will be carried along by the latter at a speed proportional to the speed of the sheet to be folded, with the plate 107 sliding over the friction ring. If the tail of the pawl is depressed, as it is by mechanism to be described while the sheet is passing over a feeler, the pawl will be held out of engagement with the teeth in disc 90 and the movement of the arm will be under the control of friction ring 95, which travels at a speed either ½ or ⅔ of the speed of disc 90 depending on the setting of the clutch shaft 62.

For the purpose of controlling the tail 105 of the pawl a circular track is provided, formed in two parts one of which is stationary and the other movable axially. The stationary part 113 (Figs. 22 and 24) is bent up from a segment 114 which is secured to a wall of the box 50 by screws 115 and spacers 116, and has a flaring portion 117 (Fig. 24), the purpose of which will be described. All of the arms stacked up within the stationary section have their pawls held out of contact with the ratchet 90. The movable part 118 is formed from the turned up edge of a cup plate 119 cut away to receive the stationary track as shown in Fig. 24, and mounted for axial motion on sleeves 120 (Fig. 14) surrounding headed screws 121. Springs 122 under the heads of the screws keep the cup plate normally against a ball spacer disc 123. This disc has a flange 124 on which it can turn on sleeve 96 as a bearing, and has three annular flanges 125 (Fig. 14) by which it can retain and control three hardened balls 126. The balls rest in conical depressions in hardened blocks 127 sunk into bosses 129 formed in the casing walls. Since the two halves of the casing are made identical these bosses appear in both, although they have a function only in one. Depressions 130 in the cup plate 119 acts as seats for the balls, when the ball spacer disc 123 is rotated slightly the balls ride up on the sides of the recesses in blocks 127 to shift the cup plate 119 toward the pawl 104, engaging its tail as shown at 118' in Fig. 14.

For rotating the ball spacing disc it has a radial extension slotted at 131 (Fig. 23) to receive a pin 132 (Fig. 22) riveted to the long arm 133 of a channel member 134 held by a set screw 135 to a rock shaft 136 extending through a wall of the casing. The rock shaft is oscillated as will be described by contact of a feeler with the work to be folded. When work is passing the feeler the balls are rolled out of their sockets and the cup plate brought into engagement with the tail of the pawl to cause the finger 99 to be driven by the friction plate only.

The short arm 137 of channel 134 is provided with wings 138 which alternately engage the sides of successive control fingers and release them in the manner of an escapement. It is an important feature of the present invention that the escapement is self-locking, so that the arms cannot push it out of the way. In prior constructions trouble has been experienced due to this cause, since frequently several arms, all being acted on by the continuously driven friction ring 95, are piled up behind the escapement which is thus subjected to considerable pressure. In the present case the line of pressure passes practically through the center of rock shaft 136 (Fig. 20) and thus does not tend to rotate that shaft to free the control arm from the wing 138.

Rock shaft 136 passes through the control box wall, and outside the latter carries a U-shaped member 139 with one long arm 140. The shaft 136 is flattened at 141 to receive a set screw 142 passing through the member 139. A rod 144 is hooked at 145 to the long arm 140, and at its other end is secured by a set screw 146 to an A-frame 147 welded to a bar 148 pivoted in stationary brackets 149. Bar 148 carries a set of feelers 150 extending between the spaced tapes of the overlying sets 20 and 22 in the case of the first folder and 21 and 22 in the case of the second folder, and also an arm 151 resting against an eccentric 152. A shaft 153 extends the entire width of the machine and a sleeve 154 surrounds it for a part of its length. The eccentrics 152 of say two of the lanes are secured to the sleeve and the eccentrics of the remaining lanes are secured to the shaft, which projects beyond the sleeve. When an eccentric is rotated to rock a bar 148 the feelers 150 are shifted and held out of the path of material being carried by the tapes, so that the folder in that lane will be made inactive. By having one set of folders controlled by the shaft and the other by the sleeve it is possible to operate the two sections in different manners, one producing a double fold and the other a single. Depression of the feelers by the fabric causes angular motion of rock shaft 136 with a consequent turning of the ball spacer disc 123 to which it is coupled by channel 134 and the pin and slot connection 131, 132. The balls 126 are thus caused to ride up on the conical sides of the blocks 127 and shift the cup plate 119 so that its track portion 118 will engage the tail of pawl 104. The fingers 99 are then driven by the friction disc 105. When the feelers are released by passage of the goods the springs 122 cause the balls to return to their seated position so that the pawl is released by the cup plate and re-engages the ratchet wheel 90. It may be noted that the shifting of the fingers 150 by the eccentric to inactive position will cause the same initial action as described except that the feeler is not released by the passage of goods and the finger 99 released by the escapement travels around under the drive of friction disc 95 until it strikes the remaining fingers piled up against the eccentric.

In normal half-folding a finger 99 is driven by friction during all the time the feeler is held by the work, its speed being proportional to half that of the work. When the end of the work releases the feeler the arm can thus be considered as being located at a point corresponding to the mid-point of the work. The finger is then coupled to the full speed disc 90 and travels at a rate proportional to the speed of the work until the mid-point of the work is opposite a folder. Slightly before this the finger will be adjacent a spring 155 (Fig. 24) mounted on a folder-actuating pawl 156 and pushes the latter against the teeth 157 of a ratchet 158 mounted on and keyed as at 159 to the constantly rotating shaft 56. The ratchet teeth are preferably slightly undercut, so that as soon as the pawl engages a tooth it will be held there until its tail 160 strikes a pin 161 which is fixedly mounted in the casing 57. During the period of engagement between the pawl and the constantly rotating ratchet the pawl is moved bodily and its movement is utilized to cause the operation of the folder.

The pawl 156 is pivoted at 162 to a pair of disks 163 which are flanged at 164 so as to ride freely on the hub of ratchet 158. One disk is pinned at 165 to a sleeve 166 rotatable on shaft 56 and projecting through the casing. Outside the latter a bell crank 167 is keyed to the sleeve 166 at 168, being rocked from the full to the dotted line position of Fig. 11 by the swing of the pawl. Associated with each control box, and serving the single lane of the machine in which the box is located, is a folder 169 composed of fingers projecting from the forward edge of a rectangular frame 170. The fingers are spaced so as to enter the spaces between adjacent pairs of tapes which transport the work pieces through the machine. Each frame 170 is connected by bolts 171 and bushings 172 (Fig. 3) to the tops of four rocking arms 173 which are pivoted at their lower ends as shown in Figs. 2 and 4. Each aligned pair of arms 173 are mounted on a spacing sleeve 174 which is in turn mounted on bearings 175 held in position on a shaft 176 by collars 177. The shaft 176 is held by collars 178 and brackets 179 which are welded to the channel 53 so that the folding mechanism will slide out of the machine with the control boxes.

The bell crank 167 is connected by a compression spring coupling 180 to a bar 181 secured to the rear pair of rocking arms 173. Preferably this connection includes a bolt and slot 182 so that the pivot point can be moved up or down relative to the arms, since in this manner the position of the folding fingers at the end of their active stroke can be controlled. Another pivot bolt 183 is adjustable in a slot 184 formed in a bracket 185 secured to the channel 53. A tube 186 is attached to the pivot, and a piston 187 within it is coupled by a rod 188 to the lower arm of the bell crank. A compression spring 189 lies between the piston and the upper end of the tube, so that the bell crank is normally held in the position for which the pivot bolt 183 is adjusted. Since this is the position in which the pawl 156 is awaiting activation by the end of a control arm 99 the adjustment 183, 184 serves as a means of controlling the initiation of the folding operation. In other words, it serves to regulate the position of the fold relative to the exact center (or third point) of the sheet. Its value is mainly that the position of the first fold determines the position of the hidden edge of the fabric after the second fold is made. In cases where the edges of the fabric are not entirely true this adjustment permits the hidden edge to be drawn back so that there is no danger of it being turned over when the second fold is made.

In cases where there is but one fold made, it is always done by the first folder, which tucks the folded material between rolls 13 and 14. If a second fold is made the second folder tucks the material between rolls 8 and 10, after which it is turned by a deflector 190 to pass down the outer surface of the belt 24. A deflector 191 strips it from that belt and directs it toward a table 192. Extending across the machine just below the latter deflector is a shaft 193 surrounded for a portion of its length by a tube 194. The angular position of the shaft can be controlled by a handle 195 (Fig. 30) while that of the tube is controlled by a handle 196. In general the tube will extend through about half the number of lanes in the machine, so that when there are some materials calling for a single fold and some calling for a double fold the lanes may be divided into two groups. On the tube 194 deflectors 197 (Fig. 27) are positioned so as to lie between the work-carrying belts. Similar deflectors 198 (Fig. 26) are secured to the shaft 193 in lanes to which the tube does not extend. The deflectors of either set can be moved by the respective handle between the full line position of Fig. 31, in which work is fed from belt 23 to the delivery table, to the dotted line position in which the work is carried down the double-fold delivery belt 24. Delivery guides 199 (Fig. 29) are mounted loosely on tubes 194 and similar guides 200 on shaft 193 to lead the folded material onto the delivery table 192.

A similar division of the lanes by means of a control shaft and a surrounding tube is used for the other mechanisms and need not be described in detail. Thus the clutch 77, 78 is operated through the rocker 69 by an arm 201 on a sleeve 202 (Fig. 11) controlled by a handle 203 (Fig. 6), or on a shaft 204 controlled by a handle 205 depending upon the position of the particular control box. The shaft 153 or sleeve 154 on which the folder throwout eccentric 152 are mounted are actuated respectively by handles 206 or 207 (Fig. 5). Suitable detent mechanism of any desired type may be used to hold the handles in adjusted position.

It was mentioned previously that the stationary track 113 was terminated in an outwardly flaring end 117. This serves to engage the tails of the pawls 104 without shock and to free the pawl tooth 112 from the teeth on disk 90. A shoulder 208 near the base of the flaring end 117 serves to engage the pawl tails 105 if accidentally the shaft 56 is rotated the wrong way, as it easily might be in setting up or adjusting the machine. Were some such safety device not used a plurality of control arms might be forced around within cup plate 118, and driven positively by ratchet 90 in the wrong direction with consequent damage to the machine.

What we claim is:

1. An automatic compact folding machine comprising an infeed set of endless tapes at one end of the machine, a central set of endless tapes, a first delivery set of endless tapes at the other end of the machine, a second delivery set of endless tapes above said first set of delivery tapes, an intermediate set of endless tapes above said other sets of tapes arranged to contact successively and in one to one relation the tapes of the infeed, central, and second delivery sets, one set of folding blades positioned to tuck the material between the central and intermediate tapes at their initial point of contact, and a second set of folding blades positioned to tuck the material between the intermediate and second delivery tapes at their initial point of contact, said central set of tapes being mounted on three rolls to provide a central space for a mechanical folding blade actuator and an additional roll being provided for deflecting said infeed set of tapes to provide space for another mechanical folding blade actuator.

2. An automatic folding machine as claimed in claim 1 having a first work-measuring folder control means located outside the endless infeed tapes to control the first set of folding blades and a second work-measuring control means located inside the endless central tapes to control the second set of folders.

3. An automatic folding machine as claimed in claim 1 having means for rendering the second folding blades inoperative without affecting the operation of the first folding blades.

4. An automatic folding machine as claimed in claim 1 having a single delivery table adjacent both the first and second delivery tape sets, and means for rendering the second folding blades inoperative without affecting the operation of the first folding blades, whereby goods folded by the first folding blades will be carried to the delivery table by the second delivery tapes when the second folding blades are operating and by the first delivery tapes when the second folding blades are inoperative.

5. An automatic folding machine as claimed in claim 1 having a single delivery table adjacent both the first and second delivery tape sets, means for rendering the second folding blades inoperative without affecting the operation of the first folding blades, whereby goods folded by the first folding blades will be carried to the delivery table by the second delivery tapes when the second folding blades are operating and by the first delivery tapes when the second folding blades are inoperative, and a deflector pivoted adjacent the delivery table and mounted to swing from alignment with one of the delivery tape sets to alignment with the other.

6. An automatic folding machine comprising tapes for conveying flat work, a plurality of folders arranged in line and operable in groups independently of each other, and control means extending from each folder mechanism to one end of the machine, said control means comprising a rod extending to and controlling the furthest group of folders, a sleeve surrounding the rod and controlling the nearer folders, and separate handles for rotating the rod and the sleeve.

References Cited in the file of this patent

UNITED STATES PATENTS

| Number | Name | Date |
|---|---|---|
| 1,084,246 | Binder | Jan. 13, 1914 |
| 1,474,781 | Kohn | Nov. 20, 1923 |
| 1,519,733 | Kohn | Dec. 16, 1924 |
| 1,581,753 | Mayer | Apr. 20, 1926 |
| 1,894,143 | Albrecht | Jan. 10, 1933 |
| 1,960,940 | Kahn | May 29, 1934 |
| 2,034,040 | Johnson | Mar. 17, 1936 |
| 2,222,076 | Kahn | Nov. 19, 1940 |
| 2,246,256 | Kahn | June 17, 1941 |
| 2,261,226 | Clegg | Nov. 4, 1941 |
| 2,268,037 | Kahn | Dec. 30, 1941 |
| 2,275,964 | Johnson | Mar. 10, 1942 |
| 2,280,954 | Kahn | Apr. 28, 1942 |
| 2,302,656 | Dray | Nov. 17, 1942 |
| 2,306,448 | Kratz | Dec. 29, 1942 |
| 2,335,970 | Schmidt | Dec. 7, 1943 |
| 2,506,011 | Caulifelo | May 2, 1950 |
| 2,510,185 | Malott, Jr. | June 6, 1950 |